United States Patent

[11] 3,619,016

| [72] | Inventor | Charles E. Kraus<br>Allendale, N.J. |
|---|---|---|
| [21] | Appl. No. | 871,458 |
| [22] | Filed | Sept. 9, 1969 |
| [45] | Patented | Nov. 9, 1971 |
| [73] | Assignee | Excelermatic, Inc.<br>Continuation-in-part of application Ser. No.<br>707,911, Feb. 5, 1968. |

[54] HYDROSTATIC BEARING
24 Claims, 13 Drawing Figs.

| [52] | U.S. Cl. | 308/160 |
|---|---|---|
| [51] | Int. Cl. | F16c 17/04 |
| [50] | Field of Search | 308/8, 160 |

[56] References Cited
UNITED STATES PATENTS

| 3,119,639 | 1/1964 | Adams | 308/A |
|---|---|---|---|
| 3,137,530 | 6/1964 | Kohler | 308/A |

*Primary Examiner*—Martin P. Schwadron
*Assistant Examiner*—Frank Susko
*Attorney*—Theodore L. Bowes

ABSTRACT: A hydrostatic bearing for supporting a load-carrying member or assembly, such as the roller in a toroidal drive, from a stationary frame or casing in which a spacer carried by the load member and the stationary member define a secondary cavity within a primary cavity and within which there is a pressure responsive element, such as a single or multiple ring, subjected to fluid under such pressure and in such directions as to interpose fluid between the stationary member and the pressure element and between the pressure element and the load-carrying member and which constitutes a balancing factor.

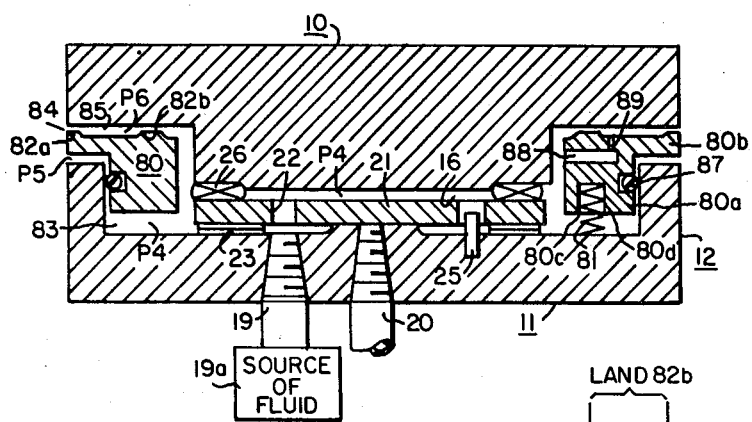
FIG.6
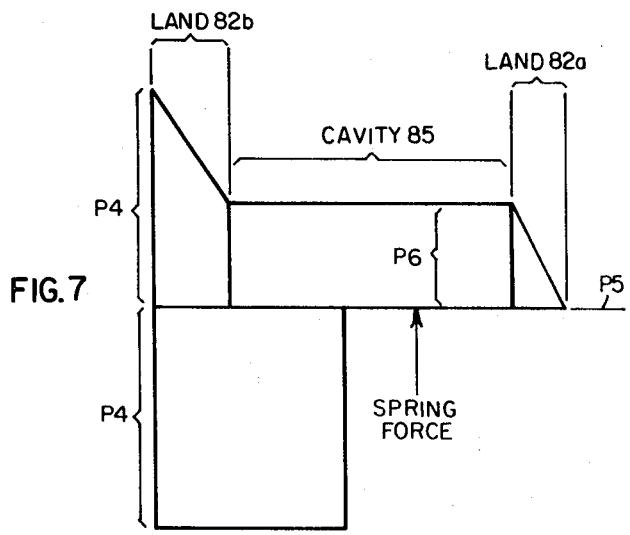
FIG.7
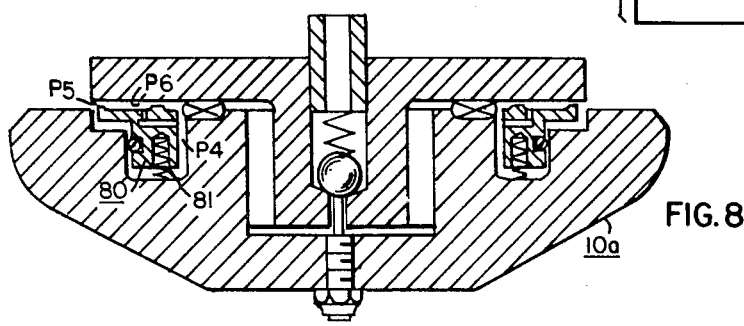
FIG.8
FIG.10
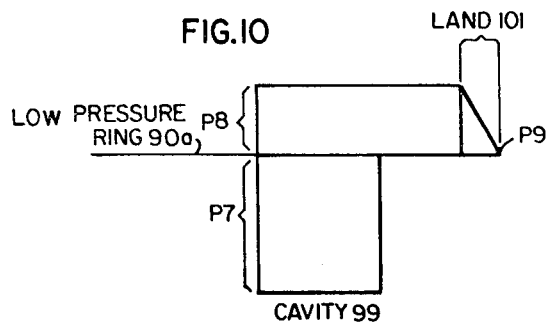
FIG.9

HYDROSTATIC BEARING

This is a continuation-in-part of my copending application Ser. No. 707,911, filed Feb. 5, 1968 now abandoned.

BACKGROUND OF THE INVENTION

Several types of hydrostatic bearings are well known. In some forms, a shaft or runner surface is positioned adjacent a mating surface as, for example, a shaft within an opening in the end plate of rotating apparatus. Openings or depressions are provided in one or both matching surfaces which are connected to a source of high-pressure fluid such as a suitable pump. The fluid pressure separates the shaft from the surrounding surface and the fluid flows through the resulting clearance. The clearance is controlled, of course, by the volume and pressure of fluid supplied. This type is highly developed and very versatile. For example, journal bearings may have multiple pressure openings each supplied by a constant volume of fluid by means of constrictors or other flow control devices. If the shaft moves toward one side, pressure builds up at that side and the other side dumps pressure. Such bearings are stable and almost friction free. This type is disadvantageous in that a relatively large space is occupied compared to the load capability of the bearing.

A second type of hydrostatic bearing, of more restricted use, employs high-pressure face seals to contain the entire bearing area which is supplied with pressure from a pump. Usable only for thrust bearings and with face seals, it is a zero flow bearing in which means must be present to match the load to pump pressure. While this type of bearing is very good theoretically, the seals are relatively fragile, subject to dirt damage, and expensive.

Hydrostatic thrust bearings are particularly useful in toroidal type variable speed-ratio transmissions. Antifriction bearings are not able to handle loads as large as the load capabilities of the traction contact means, are relatively expensive, and of unpredictable life. Hydrostatic bearings are not subject to such disadvantages. One application of such bearings is disclosed in my prior U.S. Pat. 3,163,051 issued Dec. 29, 1964. Toroidal drives are limited by the capacity of the thrust bearings supporting the driving and driven discs and the rollers.

SUMMARY OF THE INVENTION

Summarizing my invention in terms of the preferred embodiments shown and described herein, there is provided a load-carrying member, such as a turbine shaft or a toroidal roller, and a stationary support or casing. These parts are dimensioned to provide a load-carrying cavity and at least one control cavity region. A pressure responsive element, such as an annular ring, having limited axial movement within the cavity moves in response to differences of fluid pressure on different portions of the element and acts as a flow-type seal.

BRIEF DESCRIPTION OF THE DRAWING

FIGS. 6 and 7 illustrate a second embodiment of my invention;

FIG. 8 illustrates a variation of the embodiment illustrated in FIG. 6;

FIG. 9 illustrates still another embodiment;

FIGS. 10 and 11 show pressure distribution diagrams applicable to the bearing of FIG. 9;

DESCRIPTION OF THE PREFERRED EMBODIMENTS

Figure 1:
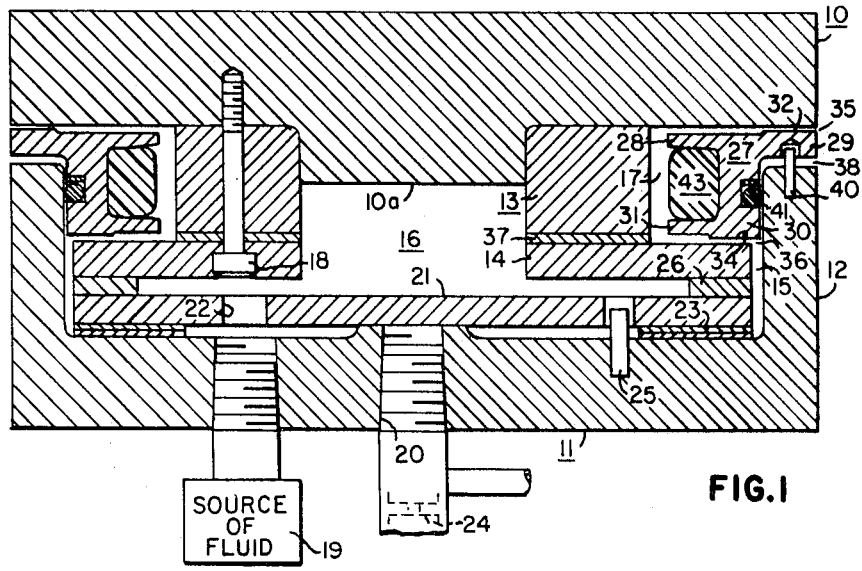
FIG. 1 is a sectional view of a hydrostatic bearing embodying the invention.
Figure 2:
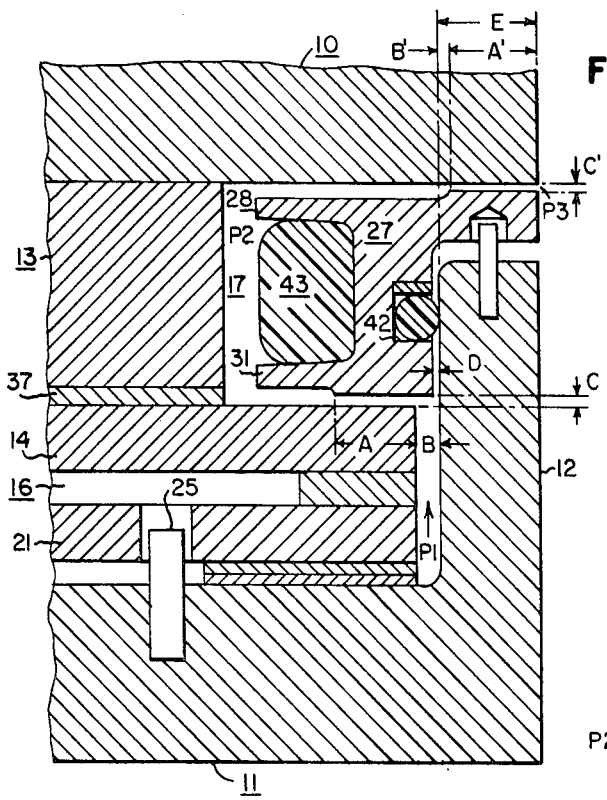
FIG. 2 is an enlarged view of a portion of the bearing of FIG. 1.

Referring to FIGS. 1 and 2, there is shown one embodiment of my invention wherein a load member 10 such as, for example, a rotatable race is provided with a hydrostatic bearing. Adjacent to the load member is a stationary supporting member 11 having an upwardly directed annular sleeve portion or flange 12. Member 10 has a downwardly directed extension 10a. Surrounding extension 10a is a spacer 13 of greater axial length than the extension. Below the spacer there is provided an annular ring cover 14 which extends radially close to the inner face of portion 12 to provide a gap 15. The aforementioned parts define a primary or load-carrying cavity or region 16 and a secondary or control cavity or region 17. Spacer 13 and cover 14 are arranged to rotate with load member 10 as by suitable fastening means such as bolts 18.

In order to provide a bearing force against the rotating, i.e., load-carrying, assembly, there is provided a suitable source of fluid such as oil, water, air or cryogenic gas, either from a fixed volume pump of volume adequate for bearing requirements or from a flow control valve if several bearings are served from one pump. Fluid from source 19a (FIG. 6) enters cavity 16 through a suitable inlet 19 in support 11. The fluid return is by way of exit-opening 20 normally closed by exit valve disc 21 having one or more inlet openings 22.

Flow-type seal means is provided in secondary cavity 17 for substantially sealing the space between members 10 and 11 and for assisting in controlling the pressure of fluid within the cavities by providing a control flow orifice which backs up pressure in the secondary cavity. Means, such as a Belleville spring 23, tends to lift disc or plate 21 against the pressure on its upper side. Outlet metering is provided as by a restrictor orifice 24 to provide back pressure for operating a pressure switch, for example. Fluid passing through orifice 24 may be returned to a drain or pump. Rotational or lateral movement between disc 21 and support 11 is prevented, as by means of pins 25. A static support bearing 26 is interposed between cover 14 and plate 21.

A fluid-pressure responsive member, shown in the form of an annular bearing ring 27, is disposed in cavity 17 coaxially with spacer 13. Ring 27 comprises an upper portion having an inwardly extending member or flange 28 and an outwardly extending member or flange 29, and a lower portion 30 comprising an inwardly extending member or flange 31. Flange 29 is provided with an upwardly disposed land 32 of width to be determined as later described. Portion 30 is provided with a depending land 34 of width to be determined as later described.

Annular spacer 13 preferably has the same thickness as ring 27.

In order to provide clearances or passages 35 and 36 for fluid flow across lands 32 and 34, there is provided separating means such as a shim 37 of thickness equal to the sum of gaps 35 and 36.

The upwardly extending annular portion or sleeve 12 is dimensioned to provide an opening 38 for receiving flange 29 with sufficient clearance to enable ring 27 to move vertically as viewed in FIGS. 1 and 2.

In order to prevent rotation of support 11 and ring 27, there is provided suitable means such as pins 40, keying support 11 and ring 27.

Thus, there is illustrated in FIGS. 1 and 2 a general application of my invention to the hydraulic support of a rotating assembly comprising the rotating member 10, ring spacer 13, shim 37 and ring cover 14.

As FIGS. 1 and 2 illustrate, there has been provided an annular cavity 17 within which the bearing ring 27 is positioned with clearance at side pads or lands 32 and 34. Means, such as O-ring 41 retained in recess 42 in the outer face of ring 27 may be provided to seal the space between ring 27 and the inner wall or face of portion 12 of support 11. The O-ring or other seal is not essential, especially if the clearance between ring 27 and portion 12 is very close. A small amount of leakage is not important. However, use of a seal avoids any need for very close tolerances.

Fluid passes into cavity 16 and provides thrust against extension 10a and other members of the load-carrying assembly. Fluid also passes through gaps 15 and 36 into cavity 17, and leaves cavity 17 through clearance or gap 35. Since outlet 20 is closed by plate 21, pressured will increase to such a level that the load is lifted and fluid flow starts through outlet 20.

Since the entire transverse areas of the ring member are subject to fluid pressure, the present design maximizes thrust capacity for a given size bearing or for a given load-carrying capability.

Figure 3:
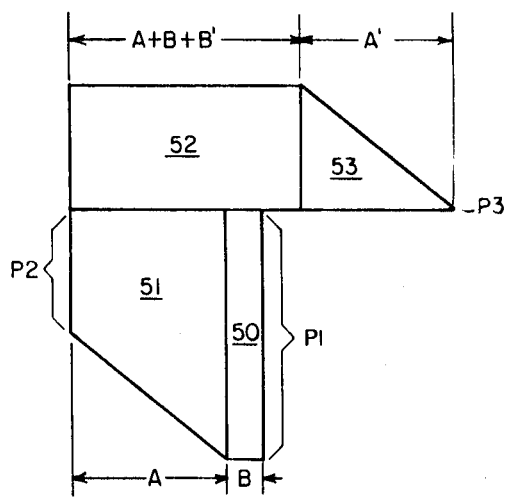
FIG. 3 shows a pressure distribution diagram applicable to parts of the bearing disclosed in FIGS. 1 and 2.

FIGS. 2 and 3 are useful in understanding the action of the bearing seal disclosed herein and the balancing of forces on ring 27. The clearances of ring lands 32 and 34 are designated as C' and C, respectively.

Ring 27 and sleeve 12 of support 11 are dimensioned to provide clearance D in the secondary cavity 17. The outer diameter of sleeve 14 is less than the inner diameter of sleeve 12 by an amount indicated as B. The effective land width on the high-pressure side is represented by A. On the opposite side of ring 27, the flange 29 extends beyond the cavity radius a distance E and has a land width A'. The difference between dimensions E and A' is designated B'.

Fluid at pressure P1 flows past land 34 into cavity 17 at pressure P2 and then past land 32 to the outside at pressure P3. Referring to FIG. 3, pressure P1 acting on the ring area B produces a force indicated by area 50. The pressure across land 34 (area A) can be represented by area 51 in FIG. 3. On the other side, pressure P2 acts on area (A+B)+B' to produce force area 52, and the pressure across land 32 (area A') is represented by area 53. If the ring forces are balanced, the sum of areas 50 and 51 equals the sum of areas 52 and 53. It is desirable that clearances 35 and 36 be equal or approximately so. These relationships may be used to dimension various parts. Thus, if values are assigned to A, B, and B', it is simple to compute a value of A' that provides equilibrium.

The distance B determines radial movement limits of the seal and imposes centering force on ring 27. If it is assumed that land 34 is tight against cover 14, only the force on area 50 represented by B would be effective to lift ring 27. Similarly, dimension B' is important because if land 31 is tight against member 10, only the B' component of force area 52 tends to separate ring 27 from load member 10.

If it is assumed that the ring is displaced toward the low-pressure side, fluid flows in faster than it flows out through passage 35. Hence, pressure P2 increases and ring 27 begins to move toward the high-pressure side. Now, if ring 27 moves past midpoint, fluid flows out faster than it flows in and P2 decreases so that the ring moves back toward equilibrium.

If dimensions and pressures are not correctly chosen, P2 may fluctuate and vibration may result. In order to damp any vibration from this cause, there is provided a highly compressible ring 43, such for example as a ring of urethane foam which is largely air, for absorbing most or all of any pressure fluctuations.

Figure 4:
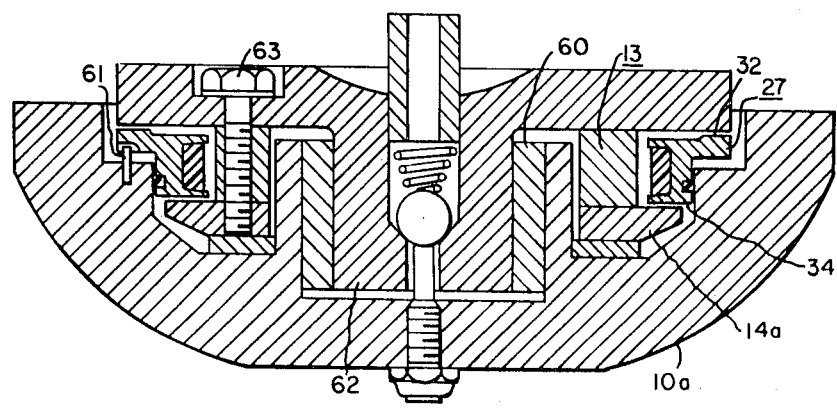
FIG. 4 shows an application of the bearing to a traction roller in a toroidal type device.

In FIG. 4, there is shown an application of my invention to a traction roller 10a of the type illustrated in my prior U.S. Pat. No. 3,163,051. In the arrangement of FIG. 4, there is provided inlet metering of fluid similar to the system of the above-identified patent, and a radial bearing 60. Moreover, the hydrostatic bearing and seal is inverted relative to the arrangement of FIG. 1. Thus, ring 27 is attached to roller 10a as by pins 61 and both rotate, whereas spacer 13, cover 14a and spindle 62, held together suitably as by bolts 63, are stationary.

Figure 5:
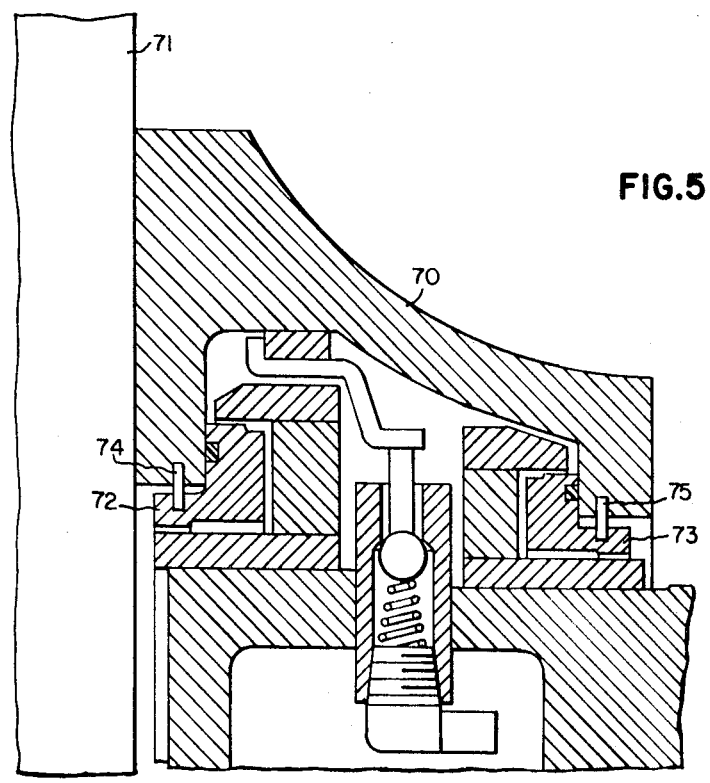
FIG. 5 shows an application of the bearing to the traction disc in a toroidal type device.
Figure 11:
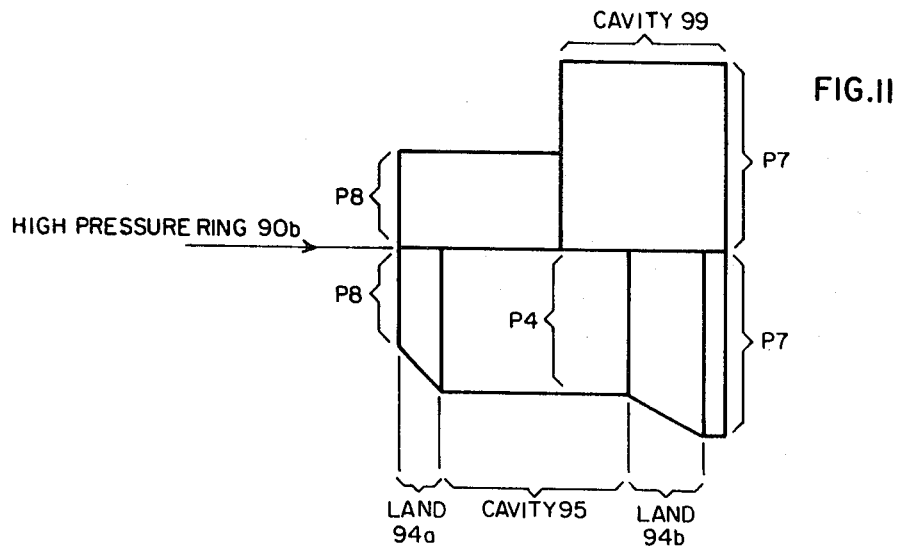

In FIG. 5 there is disclosed an application to a traction disc 70 of a toroidal-type drive, such as illustrated in my prior patent. In this embodiment, a shaft 71 goes through the bearing and two rings are utilized as shown by reference characters 72 and 73, these rings being keyed to disc 70 as by pins 74 and 75.

The bearings described herein can be optimized for minimum losses for any load and speed conditions or for the lowest average over a series of loads and speeds. The losses are of two kinds. Fluid shear on the land areas, which increases about as the square of speed, directly with area and inversely with clearance but nearly independent of pressure, and pumping losses which increases about as the square of pressure and the cube of clearance but nearly independent of speed. Properly optimized they show the lowest overall losses of any bearing known. There is no contact and, if the fluid is clean, there is no wear. They, therefore, have no dynamic capacity rating in the sense antifriction bearings have. They can handle, with indefinite life, any loads of traction drives without impractical pressures and will raise the efficiency of the drives by reducing bearing losses.

Reference is now made to FIGS. 6 and 7 which disclose a second embodiment of my invention. Those parts corresponding to the same parts in FIG. 1 carry the same reference numerals. Ring 27 of FIG. 1 is replaced, however, by a pressure responsive member shown as an annular ring 80 having body portion 80a and extension portion 80b extending into the space between load-carrying member 10 and flange 12 of the supporting member 11.

The bottom wall 80d of ring 80 is provided with a suitable number, preferably 4 to 8, of axially directed openings 80c for receiving springs 81, the lower ends of which engage support member 11.

The upper face of ring 80 is provided with annular lands 82a and 82b of such dimensions as to provide restricted passage between region of control cavity 83 and atmosphere, represented by numeral 84. The area between the lands constitutes a chamber 85, the purpose of which will be described later.

The space between flange 12 and the adjacent face of portion 80a of ring 80 is substantially sealed by O-ring 87.

In order to provide a positive force to insure that ring 80 will not be held against member 10 by springs 81, there is provided a plurality of openings 88 into the interior of ring 80 and restricted orifices 89 extending from openings 88 into chamber 85 to develop therein a pressure P6. Other means for regulating the pressure in chamber 85 may be utilized; for example, inner land 82b may be provided with sufficient clearance to provide the desired pressure within chamber 85. The orifices are usually very small. For example, in one assembly, No. 80 drills (0.0135 inch diameter) have been used to produce the orifices. Obviously, flow of fluid is determined by orifice size. Flow must be sufficient for shear heat control but not wasteful of pump power.

Pressure in chamber 16 is designated as P4. The same pressure is attained in cavity 83 because fluid passes practically unrestrictedly through roller bearings 26. The pressure on the outlet side of ring 80, usually atmospheric, is designated P5. The pressure within chamber 85 is designated P6. The force graph, FIG. 7, shows that ring 80 is force balanced and does not touch the stationary surfaces.

When in a force-balanced condition as shown in the force area graph of FIG. 7 there is a pressure P4 in the cavity 83. If the ring is against the rotating part 10 so no oil escapes past lands 82a and 82b, pressure P6 would come up to P4. The area of the cavity 85 must therefore be greater than the effective area on the opposite side, always subject to P4, in order to push the ring down. When it is pushed down, fluid flow past land 82b drops P6 until the ring is force balanced.

It may be well to point out a difference in operation between this orifice-controlled design and the ring designs of FIGS. 1, 2, 3 and 4. The rings 27 are force balanced but movement tending to open one land gap closes the other and can set up an oscillating condition which can resonate under some conditions. That is why sponge pads 43 are shown. Adding compressible volume stops the tendency to vibrate. The orifice-controlled ring does not show this tendency. The orifice flow is steady and in turn steadies the entire ring action and the ring is inherently stable.

In FIG. 8, there is illustrated an application of the arrangement of FIG. 7 to a roller 10a of a toroid traction drive corresponding to FIG. 4.

In FIG. 9, there is disclosed, generally schematically, a modification in which the pressure-balancing element or ring 27 in FIG. 1 and 80 of FIG. 6 is replaced by a pressure responsive element 90 having separable annular portions or nested rings 90a and 90b. I show O-rings 91 and 92 to seal element 90 from member 11 and between the rings. Both rings of element 90 can move relatively independently of each other under the influence of their force systems. The O-ring resistance is small in percentage to the forces acting. The ring is held by O-ring friction to the flange 12 in this embodiment (it should be recognized that the rings will rotate with the rotating element of a drive of the type shown in FIG. 8 because of friction between the O-rings and adjacent parts).

In this embodiment, three internal chambers or cavities are formed. The pressure in the bearing itself is labeled P7. Pressure identified by symbol P9 is about atmospheric at the seal discharge. The pressure in first chamber 93 is labeled P8 and is separated from input pressure P7 by high-pressure ring 90b and is determined by the dimensions of lands 94 and 94a on the lower wall of ring 90b; a second chamber 95 is thus defined by the extension providing lands 94 and 94a and flange 12 of stationary member 11. As shown in FIG. 9, lands 94, 94a have different widths for flow control purposes.

The third chamber 99 is defined by rings 90a and 90b and member 11. O-rings 91 and 92 are held in place by an annular shoulder 96. To provide communication between opposite sides of this shoulder, in addition to the clearance between parts, several grooves 97 may be provided. This chamber operates at pressure P7 because of the clearance between high-pressure ring 90b and member 10 indicated by numeral 98.

Dimensions are chosen to make pressure P10 intermediate that of P7 and P8.

To recapitulate, there are provided three cavities or chambers, namely, chamber 93 between ring element 90, rotating element 10 and spacer 13, high-pressure chamber 95 between lands 94 and 94a, and "O" ring chamber 99 at pressures P8, P10, and P7, respectively.

Ring or portion 90a may be considered the low-pressure ring. On the left end and upper side, as viewed in FIG. 9, it is subject to pressure P8; on the outer end to pressure P9; and at shoulder 96 to pressure P7. With respect to high-pressure ring 90b, it is subject to pressure P10 on its under side (partially defining cavity 95); on the right hand end and upper right face partially defining cavity 99, it is subject to pressure P7; on the left and upper left sides it is subject to pressure P8. Pressure P8 is maintained above atmosphere by a restricted opening 100 between land 101 and member 10. Obviously, pressure P8 is a function of the areas on which these pressures act and element 90 is free to float in order to allow any flow necessary across land 101 so long as pressure P8 remains a fixed percentage of pressure P7 as determined by the ratio of these areas.

The high-pressure portion ring 90b of element 90 is also force balanced and has no inherent flow control. There are two force balance points to consider. If the high-pressure gap 98 is zero, which may occur, particularly on startup, pressure P7 may hold the ring locked up. To prevent this condition, flow-control orifice 102' is provided. This orifice admits fluid at pressure P7 into chamber 95. By making the volume of this chamber greater than that of the O-ring chamber 99, the seal is blown off its seat and the high-pressure gap is opened. Flow of fluid across land 94 adds to the flow through orifice 102' and the combined flow reaches cavity 93 across land 94a.

The force balance is determined by ring areas, and pressure P10 in chamber 95 stabilizes almost independently of flow values. It has been found that increased stability is achieved by making land 94 wider than land 94a and appropriately selecting the areas of portion 90b subject to pressures P7 and P8. It has also been found that by making orifice 102' a sharp-edged orifice, the flow of fluid is almost independent of the viscosity of the fluid and less affected by pressure (the square root rather than direct). Thus, the flow does not decrease rapidly with light load or go to excess on overload. If the fluid is cold and viscosity high, the seal gaps increase automatically to accommodate the flow; the wider gaps reduce the shear forces so that they are not a problem, even under conditions of subzero temperatures.

Seal gaps are not fixed but determined mainly by flow requirements dictated by the orifice and the square root of pressures. Pressures P8 and P10 are determined by ring geometry and are nearly independent of flow and viscosity.

The two-piece element construction has the particular advantage that it is relatively unaffected by dirt because the seals can open temporarily to pass dirt which is not true if fixed gaps are present.

This embodiment comprises a balanced two-ring pressure responsive element, variable gaps, three internal chambers or cavities, three flow lands, and orifice flow control.

It may clarify the force graphs to compare FIGS. 3, 7, 10, and 11. Referring to FIG. 3, if ring 27 moves up or down, flow into or out of cavity 17 is effected in the opposite direction and pressure P2 changes rapidly. When stable, and if the gaps are about equal in and out, the force balance is as shown.

Referring to FIG. 7, springs 81 and orifices 89 (See FIG. 6) constitute two additional factors. Pressure P4 plus the spring force remains steadily on the high-pressure side. Orifice flow at a stable rate continually enters cavity 85 and will cause pressure P4 to increase until the ring 80 is pushed down (in FIG. 6) when fluid escapes to atmosphere (P5). Fluid also enters cavity 85 across land 82b so that a pressure balance is obtained by a geometric balance of land widths and pressure areas. For a given ring design, however, it is found that the value of pressure P6 in cavity 85 is substantially fixed relative to pressures P4 and P5 and the flow of fluid is proportional to the flow from orifices 89. Optimum areas of lands and cavity can be computed for best efficiency for various average speed and/or viscosity ranges.

In FIG. 10, there is shown the force balance for the low-pressure ring 90a of FIG. 9. On the O-ring side, the force is due to input fluid pressure P7. This force is balanced by pressure P8 on the opposite side plus some force across the low-pressure land 101. Regardless of the amount of fluid flow, this force balance remains. Ring 90b moves only enough to allow excess pressure to escape. Pressure P8 is determined by areas. With respect to high-pressure ring 90b, orifice fluid at a steady flow rate controls the land gaps to hold pressure P6 to a balance value. Pressure P8 is not controlled by ring 90b so the force on the upper side of the ring is essentially constant due to Pressure P8 and P7 in the O-ring cavity. The ring geometry can be balanced for almost any flow rate but as in the single orifice ring, the area of the cavity must exceed the area on the opposite side subject to pressure P7 to initiate movement away from the adjacent wall.

Figure 12:
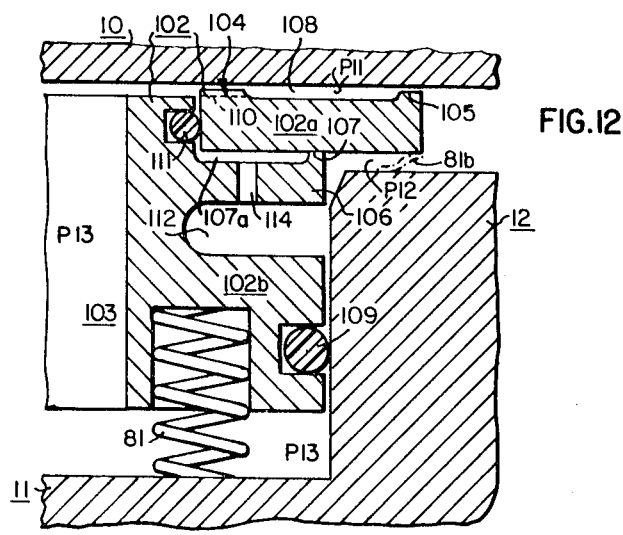
FIG. 12 illustrates still another embodiment.

In FIG. 12, there is illustrated a two-ring pressure responsive element 102 comprising a first annular portion or ring 102a and a second annular portion or ring 102b disposed in cavity 103. This embodiment is similar in general arrangement to the bearing of FIG. 6 which shows a single ring pressure responsive element orifice-controlled design. Elements of relatively small diameter operate very effectively up to about 1,000 pounds per square inch. However, elements of relatively large diameter may be subject to deflections. For example, referring to FIG. 6, due to deflection, the gap at inner land 82b may close up and the gap at outer land 82a may open, causing a drop in pressure P6 and, possibly, initiate more deflection. Similarly, deflections in the supporting member or load-carrying member may result in similar gap variations. The design of FIG. 12 is intended to minimize these problems. The ring 102a is relatively flat and thin enough to be relatively flexible and has lands 104 and 105 adjacent load-carrying member 10. By reason of its shape ring 102a has no torsional forces of practical magnitude. Ring 102b provides effective support for ring 102a inasmuch as upper arm 106 extends beyond ring 102a on its inner end and the main body extends beneath ring 102a and land 107 engages its under side. Land 107 provides an annular recess 107a. To assure flow between cavities or chambers 103 and 108, there is preferably provided a plurality of radially disposed slots 110 in inner land 104 although the same result may be effected by suitable grooving in member 10. An O-ring 111 substantially seals the space between the rings and O-ring 109 seals the space between ring 102b and flange 12.

If ring 102a is flexible and of low mass, the ring is uniformly pressed against member 10 and any surface variation should be compensated for. While ring 102a is resilient, ring 102b, by reason of its shape, is stiff. To provide spring action against ring 102a, there is provided an annular slot 112 in the outer face of ring 102b at such a location as to make arm 106a relatively thin spring section. By this means, ring 102a can follow or flex with any small out-of-flat condition or other irregularity which may exist on the adjacent surface. Ring 102b, having no sliding contact, can be spring tempered and ring 102a, being of substantially uniform thickness, can be of any suitable hardness or material at minimum cost and warpage. Suitable openings 114 between recess 107a and slot 112 limit the pressure on the under side of ring 102a, as shown, slot 112 is substantially at atmospheric pressure (P12).

While there is shown an arrangement using springs 81, these springs may be replaced by suitable springs as, for example, leaf springs 81b, between flange 12 and ring 102a as shown in dotted lines in FIG. 12.

Figure 13:
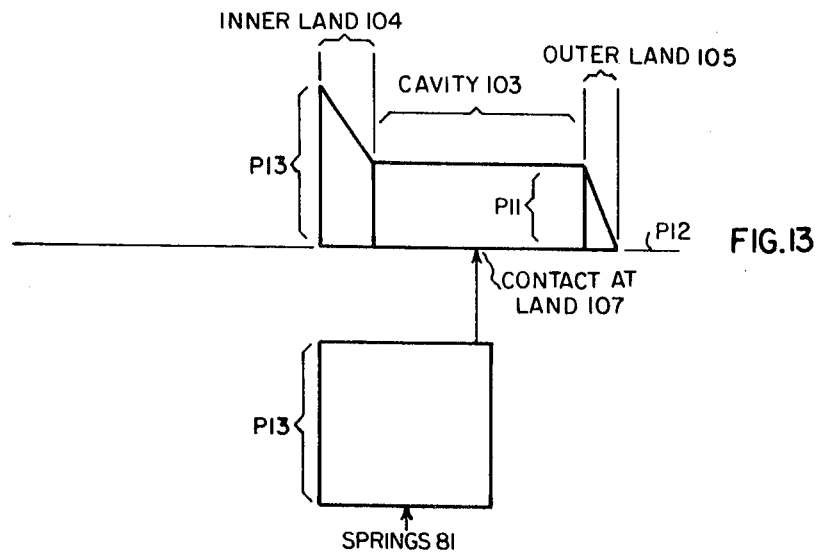
FIG. 13 shows a pressure distribution diagram applicable to the bearing of FIG. 12.

FIG. 13 is a force diagram useful in understanding the operation of the bearing in FIG. 12.

While I have described my invention in detail in several embodiments, it will be obvious to those skilled in the art that various changes, modifications, and adaptations may be made without departing from the spirit and scope thereof. For example, the principles of my invention may be used with vertical turbine thrust bearings and helicopter support bearings and it will be understood that spacer 13 and shim 37 may be combined into a single unitary spacer of sufficiently greater length than ring 27 to provide the desired clearances or gaps. In the embodiment of FIG. 6, the orifices can, in some conditions, be omitted, and long tapered lands substituted.

Referring to FIG. 9, in place of land 101 on the low-pressure ring portion, the side may be given a taper which has some advantage in passing dirt and different viscosity effects and flow characteristics obtained by using bleed holes in place of or in addition to orifices.

I aim, in the appended claims, to cover all such changes, modifications and adaptations.

1. In a hydrostatic bearing, a load-carrying member, a supporting member associated with said load member, said members being disposed to provide a load-carrying cavity and at least one control cavity therebetween, a source of fluid under pressure, a pressure responsive element in said control cavity and movable therein, means for introducing said fluid into said control cavity for applying thrust pressures between first and second portions of said pressure responsive element and adjacent surfaces of said control cavity, said thrust pressures tending to balance each other and cause floating of said element between said surfaces within said control cavity and means for permitting said fluid to flow from said control cavity.

2. The combination of claim 1 in which means is provided for damping pressure fluctuations in said control cavity.

3. The combination of claim 1 in which said load member comprises load-bearing means, spacing means, separating means, and closure means of extent substantially the same as said load-bearing means secured together in the stated order whereby said control cavity is provided between the load-bearing and closure means, said supporting member being formed substantially to close said control cavity and providing a first opening between said closure means, said pressure responsive element comprising a body having a first portion extending into said first opening, said closure means being of lesser extent than said supporting member in order to provide a second opening between the closure means and supporting member, said body having a second portion adjacent said second opening, and said fluid introducing means conducting fluid into said control cavity by way of said second opening.

4. The device of claim 1 in which there is interposed spacing means between said members of greater length than said element for providing clearances between said portions and said members for, respectively, enabling said pressures to be effective at said portions.

5. The device of claim 4 wherein said spacing means comprises a first spacer of the same length as said element and a second spacer of such length as to provide predetermined clearance between said portions and said members.

6. The device of claim 4 wherein said spacing means is carried by said load member for movement therewith and with respect to said supporting member, and said element is forced to move within said control cavity under the influence of said fluid.

7. In a hydrostatic bearing, a load-carrying member, a support member; said members being so positioned and dimensioned as to provide first and second interior cavities; said members also being spaced apart at their peripheral edges whereby there is provided peripheral communication with the exterior of said bearing; an annular ring disposed in one of said cavities; said ring having a central portion of outer dimension permitting freely axial movement within said one cavity, an upper portion having an outwardly directed flange extending into the space between said members, and a lower portion, said upper portion having an upwardly extending land at the outer edge thereof; said lower portion having a downwardly extending land adjacent the inner face of said one cavity; an annular spacer coaxially disposed within said ring, the axial dimension of said spacer and said ring being substantially the same; a plate across said one cavity below said spacer and said ring; means for separating said spacer and said plate a distance such as to provide gaps between said upper land and said load-carrying member and between said lower land and said plate; means for fastening said load carrying member, spacer, separating means and plate for movement as a unitary assembly; a source of fluid under pressure; means for conducting said fluid to said one cavity via the space between the periphery of said plate and the inner wall of said one cavity; said space and the gaps at each of said lands being predetermined to provide predetermined pressures across said lands for floating said ring between said members.

8. The device of claim 1 in which means is provided for causing said element to remain fixed relative to one of said members.

9. The device of claim 1 in which means is provided for maintaining a difference of pressure between said cavities 10. The device of claim 4 in which said maintaining means comprises a passage through said element, said passage terminating in an orifice at said control cavity.

11. The device of claim 4 in which said control cavity is defined at the ends thereof by lands having predetermined clearances from the adjacent member.

12. The device of claim 1 in which means is provided for causing said element to remain stationary.

13. The combination of claim 12 in which said causing means comprises a plurality of springs between said element and said supporting member.

14. The combination of claim 1 in which said pressure responsive element comprises a pair of adjacent portions.

15. The combination of claim 14 in which one of said portions has one surface adjacent one of said members and a second surface adjacent the other of said members.

16. The combination of claim 15 in which said portions and said members define a first chamber between said pressure responsive element and one of said members, and said one surface is recessed to provide a second chamber.

17. The combination of claim 16 in which said recessed surface is defined by a pair of lands having different widths.

18. The combination of claim 16 in which means is provided for maintaining a difference of pressure between said chambers and between said second chamber and said source of fluid.

19. The combination of claim 18 in which the means for maintaining pressure between source and said second chamber comprises a passage communicating between said source and said second chamber.

20. The combination of claim 14 in which the other of said portions has one surface adjacent one of said members, a second surface adjacent the other of said members, and a third surface adjacent said one of said portions, means substantially sealing the space between adjacent surfaces of said portions and means substantially sealing the space between said second surface and said one of said members, whereby there is produced a third chamber.

21. The combination of claim 22 provided with means for maintaining the same pressure between said source and said third chamber.

22. The combination of claim 1 in which said element has surfaces adjacent both of said members for effecting at least partial control of the flow of said fluid from said control cavity.

23. The combination of claim 1 in which said adjacent surfaces comprise first and second portions of said load-carrying member whereby a first pressure is applied to said first portion of said element and a second pressure is applied to said second portion of said element, and said second pressure tends to balance said first pressure.

24. In a hydrostatic bearing a load-carrying member associated with a supporting member, an interior control cavity defined by said load-carrying and supporting members, means for introducing fluid under pressure into said cavity, a discharge opening for discharging fluid from said cavity, and a fluid-pressure responsive element relatively movably disposed within said cavity and having first and second surface portions upon which respective first and second fluid pressure forces are applied that tend to balance each other and cause floating of said pressure responsive element within said cavity with fluid being present adjacent and in direct contact with both said first and second surface portions of said pressure responsive element, at least a portion of said pressure responsive element extending into said discharge opening in order to obstruct said discharge opening thereby controlling the rate of said fluid discharge therethrough in response to the floating position of said pressure responsive element within said cavity.

* * * * *